United States Patent [19]

Meyer

[11] 4,165,060
[45] Aug. 21, 1979

[54] PORTABLE DERAIL

[75] Inventor: J. Joe Meyer, Williamsburg, Ind.

[73] Assignee: Western-Cullen-Hayes, Inc., Chicago, Ill.

[21] Appl. No.: 884,843

[22] Filed: Mar. 9, 1978

[51] Int. Cl.² .............................................. B61L 19/02
[52] U.S. Cl. ...................................... 246/163; 246/207
[58] Field of Search ................. 246/163, 477, 207; 104/257, 258, 262, 274, 271; 269/97, 143, 147, 249; 294/85, 103; 248/71, 228; 24/243 B, 243 R; 403/386

[56] References Cited

U.S. PATENT DOCUMENTS

| 982,153 | 1/1911 | Martin | 246/163 |
| 1,239,191 | 9/1917 | Lee | 246/163 |
| 1,627,092 | 5/1927 | Hayes | 246/163 |
| 2,138,504 | 11/1938 | Overmier | 246/163 |
| 2,763,931 | 9/1956 | McMillan | 248/228 |

Primary Examiner—Trygve M. Blix
Assistant Examiner—Reinhard J. Eisenzopf
Attorney, Agent, or Firm—Charles F. Pigott, Jr.

[57] ABSTRACT

A portable derail for installation on railway track to prevent a railcar or locomotive from passing beyond a fixed point, thereby protecting workmen and equipment against accidents, the derail being lightweight and portable so a workman can carry it from one location to another, and yet being designed to function effectively under severe loading conditions and resist any tendency to slide along the rail when subjected to impact.

14 Claims, 5 Drawing Figures

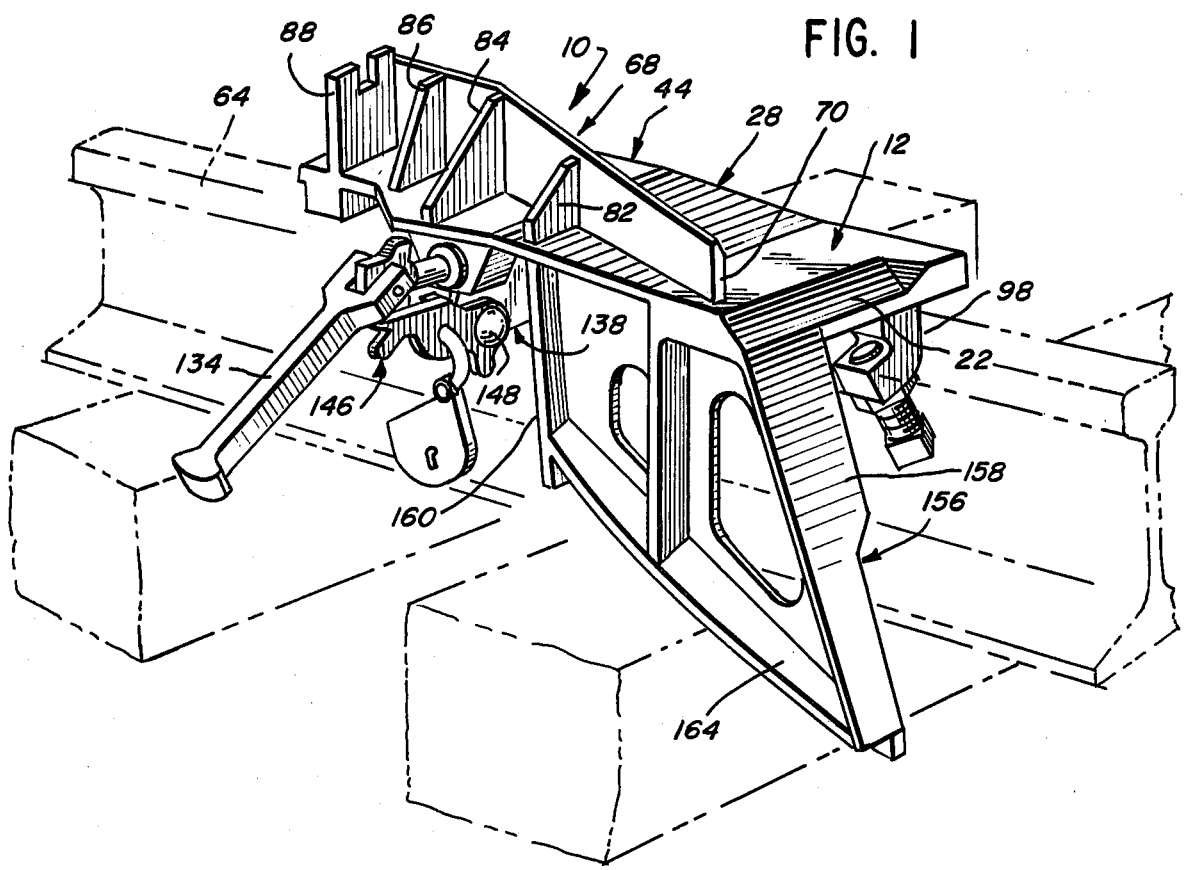
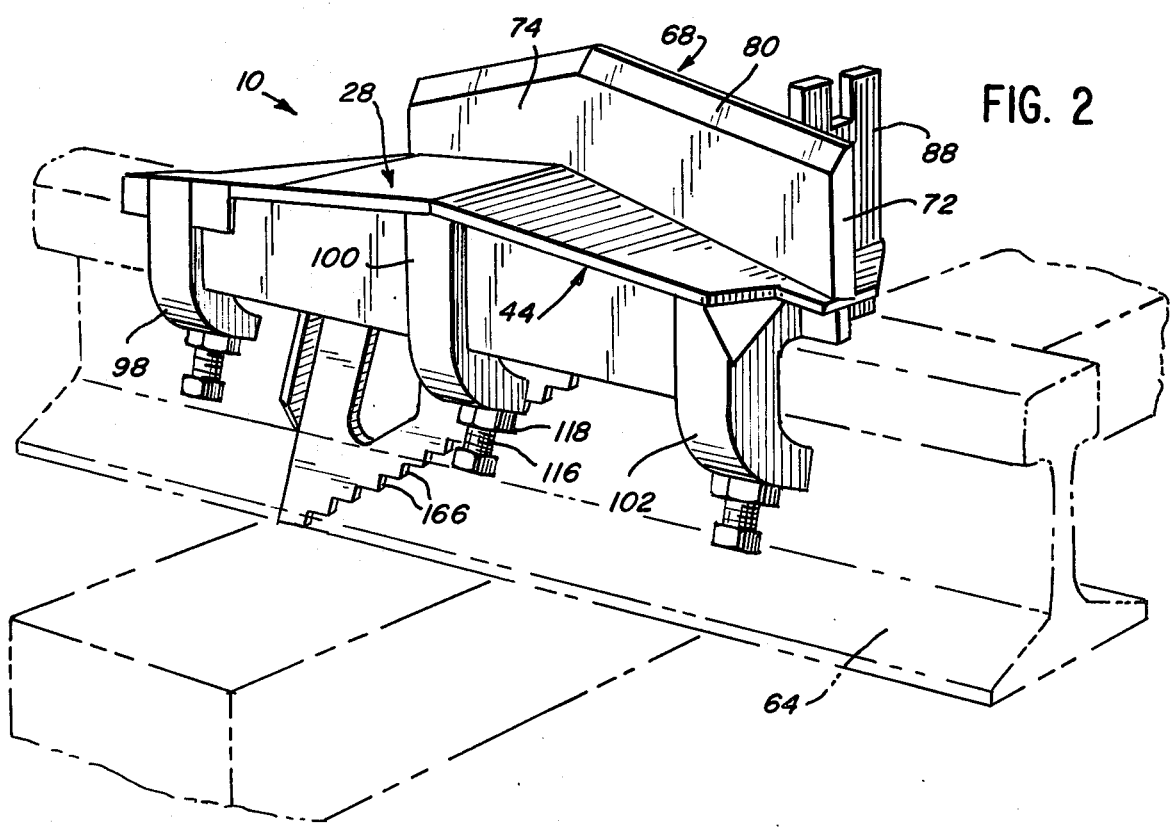

PORTABLE DERAIL

BRIEF SUMMARY OF THE INVENTION

The present invention relates to a portable derail which can be installed and locked on a rail for protection of an area beyond the derail against accidental entry of a car or locomotive, and yet is removable from the rail and sufficiently lightweight that it can be carried by a workman for installation at another desired location.

It is well known in the art to provide a derail for the purpose of derailing a car or locomotive to prevent accidental entry thereof into an area to be protected. Derails are commonly of a type which are permanently installed on a rail by anchoring a component of the derail to one or more crossties by a plurality of spikes or the like. Such derails may weigh from 150 to 300 pounds, so it is not feasible for a workman to carry them about, and it is not intended that they be removed with any frequency for transfer from one location to another. Such permanently installed derails normally include a derail block or the like which may be moved between an operative derailing position on the rail and an inoperative position alongside the rail.

In addition to permanent type derails as described above, it is also known to provide a lightweight portable derail, and such derails are especially useful to guard areas requiring temporary protection due to men working, the presence of work equipment, occupied bunk cars and other such temporary conditions. It is desirable that such a portable derail weigh less than 50 pounds so that a workman can carry it from place to place, and yet it must be sufficiently sturdy as to effectively derail a heavy car moving at a significant speed.

It is particularly difficult to secure a lightweight portable derail in operative position on a rail so it will not slide along the rail under impact and yet can be readily removed when desired. A common type of portable derail heretofore known includes a large generally C-shaped clamp which extends underneath the rail from the gage side and hooks around an outside flange of the rail base thereby anchoring the derail to the rail member. However, in certain situations, as when the ground is frozen, it is difficult to dig beneath the rail in order to install such a clamp member. Moreover, such a clamp includes a tightening screw and manually operable handle, and due to the location of the clamp it is necessary that the handle be located in the ballast and tie area where it may be difficult to operate.

Another feature common to prior art derails, both of the permanent and portable type, is that they generally must be provided in various sizes to fit different sizes of rail. In particular, a conventional derail is normally made in different sizes depending upon the height of the rail on which it is to be mounted.

It is a general object of the present invention to provide an improved portable derail which is very lightweight and yet unusually durable and capable of derailing a heavy railcar without damage to the derail.

Another object of my invention is to provide an improved portable derail including a graduated vertical support member which affords vertical support to the derail under load, is unusually effective in preventing horizontal sliding movement of the derail along the rail when a car or locomotive engages the same, and serves to adapt a derail of one size for use with various types of rails through a broad range of rail heights.

A further object of the invention is to provide a portable derail including clamp means for releasably attaching the derail to a rail by clamping to the rail head, thereby eliminating the need for digging under the rail, and eliminating the need for locating a clamp handle in the ballast and tie area.

Still another of my objects is to provide a portable derail which effects derail movement by acting on the flange of the wheel only, rather than by lifting the tread portion of the wheel, thereby producing a smoother derail action.

The foregoing and other objects and advantages of the invention will be apparent from the following description of a preferred embodiment, taken in conjunction with the accompanying drawings.

DESCRIPTION OF THE DRAWINGS

FIGS. 1 and 2 are perspective views of a right-hand portable derail constructed in accordance with the present invention;

Now, in order to acquaint those skilled in the art with the manner of making and using my invention, I shall describe, in conjunction with the accompanying drawings, a preferred embodiment of the invention.

DETAILED DESCRIPTION OF THE INVENTION

It will be understood that the portable derail of the present invention may be a right-hand derail, in which case it is mounted on the right rail of the track and derails toward the right, or the derail may be a left-hand derail, in which case it is mounted on the left rail of the track and derails toward the left. While only a right-hand derail will be described herein and in the accompanying drawings, it will be understood that the invention may be applied in the same manner to a left-hand derail.

Figure 3:
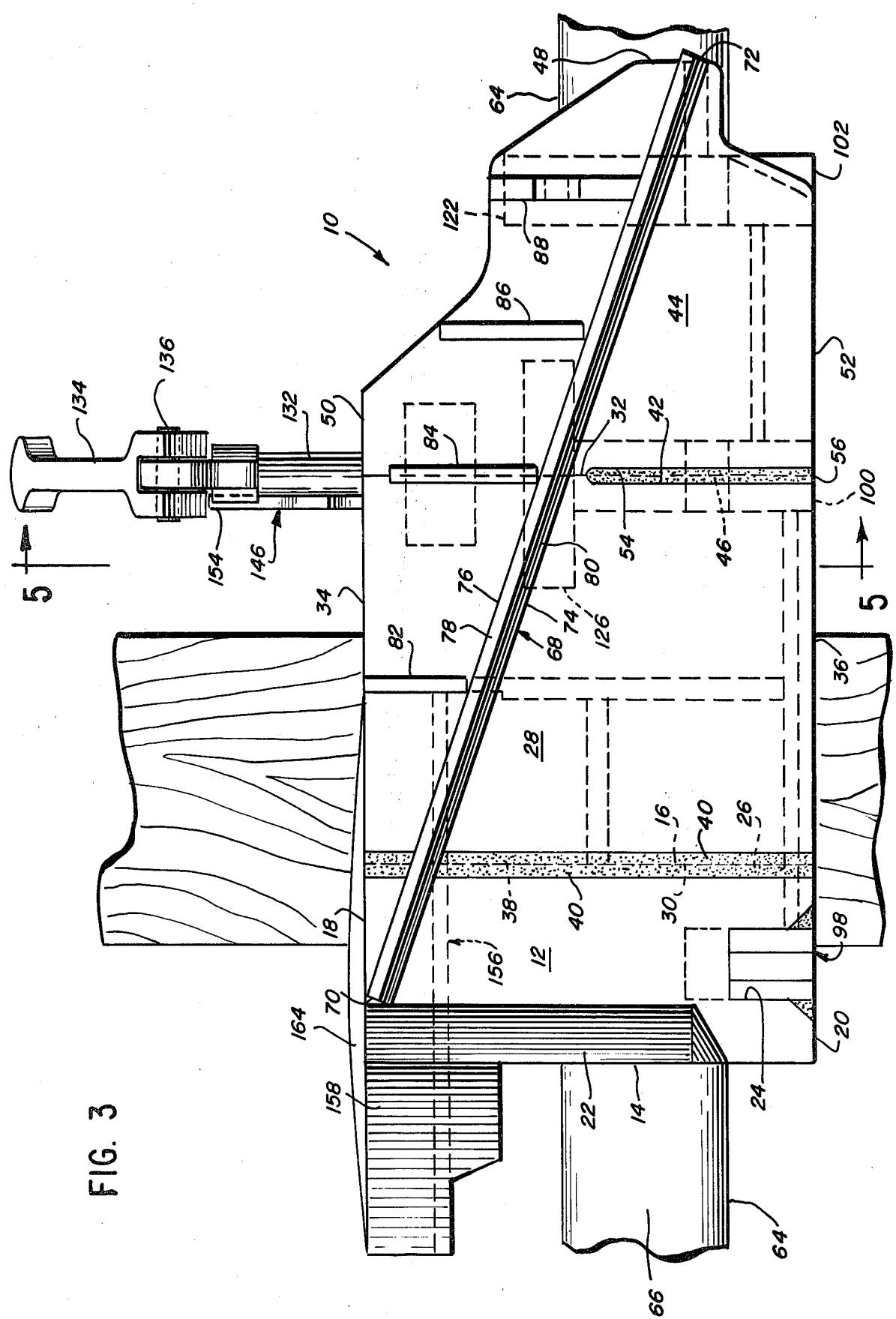
FIG. 3 is a top plan view showing a right-hand derail in accordance with the present invention mounted on a rail in operative position thereon.

Referring now to the drawings, and in particular to FIG. 3, there is shown a derail 10 having an upper generally flat portion comprising a plurality of plate-like members welded together to form a surface on which a rail wheel will roll during a derailing operation. There is shown a raiser bar 12 which is a generally rectangular steel plate having a front or entry edge 14, a rear edge 16, and side edges 18 and 20. The entry end of the raiser bar 12 is formed with a ramp 22 (see FIGS. 3 and 4) which cooperates with the flange of a rail wheel to raise the wheel from a rail to the top of the raiser bar 12. On the field side of the raiser bar 12, there is further provided a notched or cut-out portion 24 for a purpose to be described hereinafter. In addition, the rear edge portion of the raiser bar 12 is bevelled at 26 across its entire width (see FIGS. 3 and 4) to facilitate welding the bar to an adjacent component as will be described hereinbelow.

Figure 4:
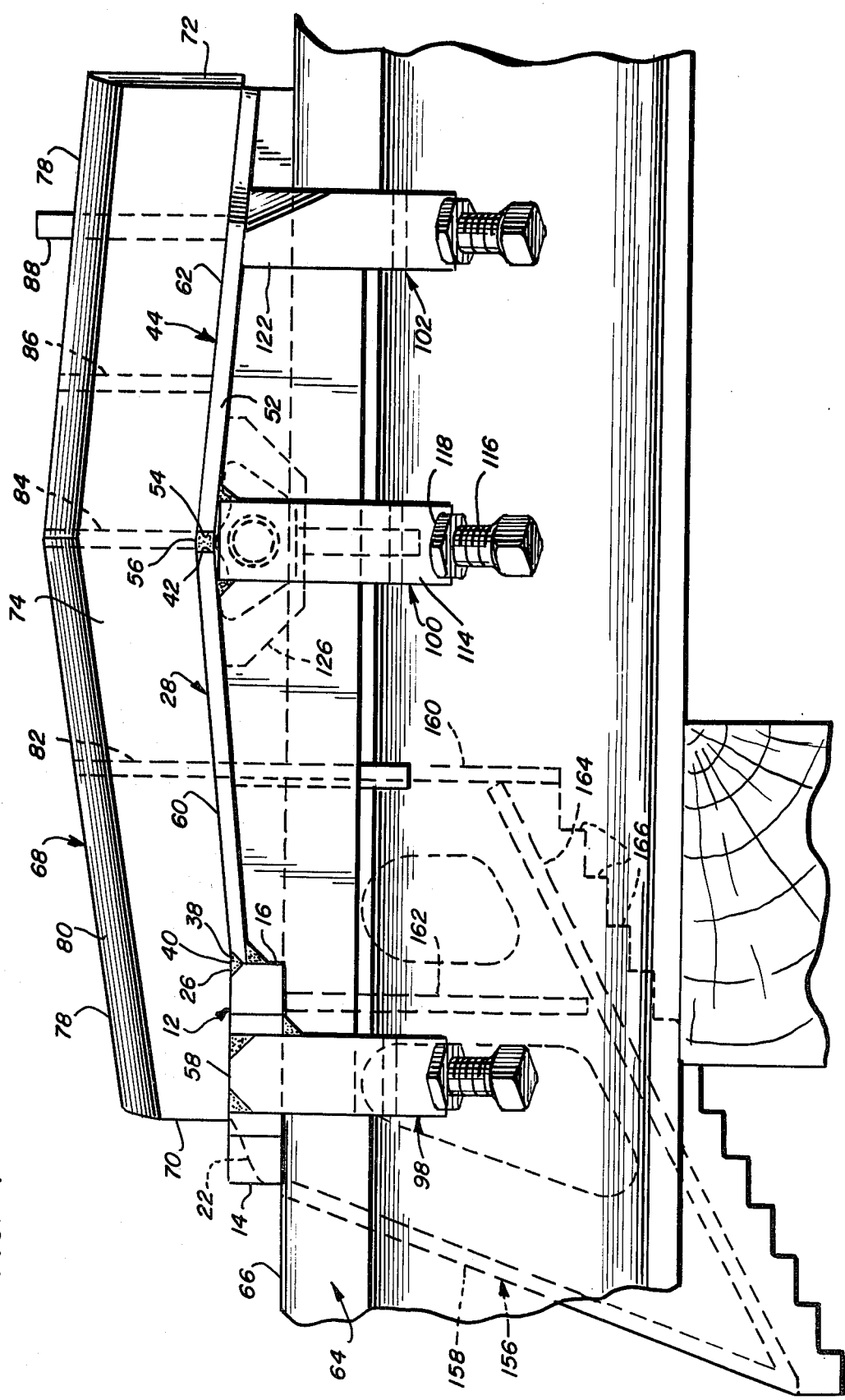
FIG. 4 is a side elevational view looking from the field side of the rail substantially in the direction of the arrows 4—4 of FIG. 3.

Still referring to FIGS. 3 and 4, adjacent the raiser bar 12 there is provided an entry shoe member 28 which is a generally rectangular steel plate-like member having a forward edge 30, a rearward edge 32, and side edge portions 34 and 36. The forward edge of the entry shoe 28 is bevelled at 38 across its entire width where the shoe abuts against the rear edge 16 of the raiser bar 12, thereby forming a V-groove which is filled with weld 40 thereby welding the raiser bar to the entry shoe across the width of the two members at the top surfaces thereof. The rear edge 32 of the entry shoe 28 is recessed slightly as shown at 42 along approximately one-half the width thereof to facilitate welding to a further component as described hereinbelow.

An exit shoe member 44 is provided adjacent the entry shoe 28 in abutment therewith. The exit shoe 44 comprises a steel plate-like member of irregular shape having a forward edge 46, a rear edge 48, and side edge portions 50 and 52. The forward edge 46 of the exit shoe is recessed at 54 adjacent the recess 42 on the entry shoe to provide a space therebetween which is filled with weld 56 thereby welding together the entry and exit shoes 28 and 44.

As shown in FIG. 4, the raiser bar 12 has a top surface 58, the entry shoe 28 has a top surface 60, and the exit shoe 44 has a top surface 62, and there is also shown a length of rail 64 having a top surface 66. It will be noted that after the elevated ramp portion 22, the top surface 58 of the raiser bar is approximately parallel to the rail, the top surface 60 of the entry shoe is inclined somewhat upwardly relative to the rail, and the top surface 62 of the exit shoe is inclined somewhat downwardly relative to the rail, whereby the top surface of the exit shoe 44 at the exit end thereof is approximately at the same height relative to the rail as the top surface 58 of the raiser bar 12.

A derail bar 68 comprises an elongated upright plate-like member which extends along substantially the entire length of the derail 10 from the entry to the exit end thereof. The derail bar 68 includes an entry end 70, an exit end 72, a vertical wall 74 on the field side of the derail bar, a vertical wall 76 on the gage side of the bar, and a top surface 78. The top surface 78 is bevelled on the field side along its entire length as shown at 80. The derail bar 68 rests on and is welded to the top surfaces of the raiser bar 12, entry shoe 28 and exit shoe 44. In addition, a plurality of transverse plate members 82, 84, 86 and 88 (see FIG. 3) are welded to the top surfaces of the entry and exit shoes 28 and 44 and to the side wall 76 of the derail bar to brace the latter during a derailing operation when a rail wheel moves along the side wall 74 which forces the wheel off the end of the exit shoe 44 to the field side of the rail 64.

Figure 5:
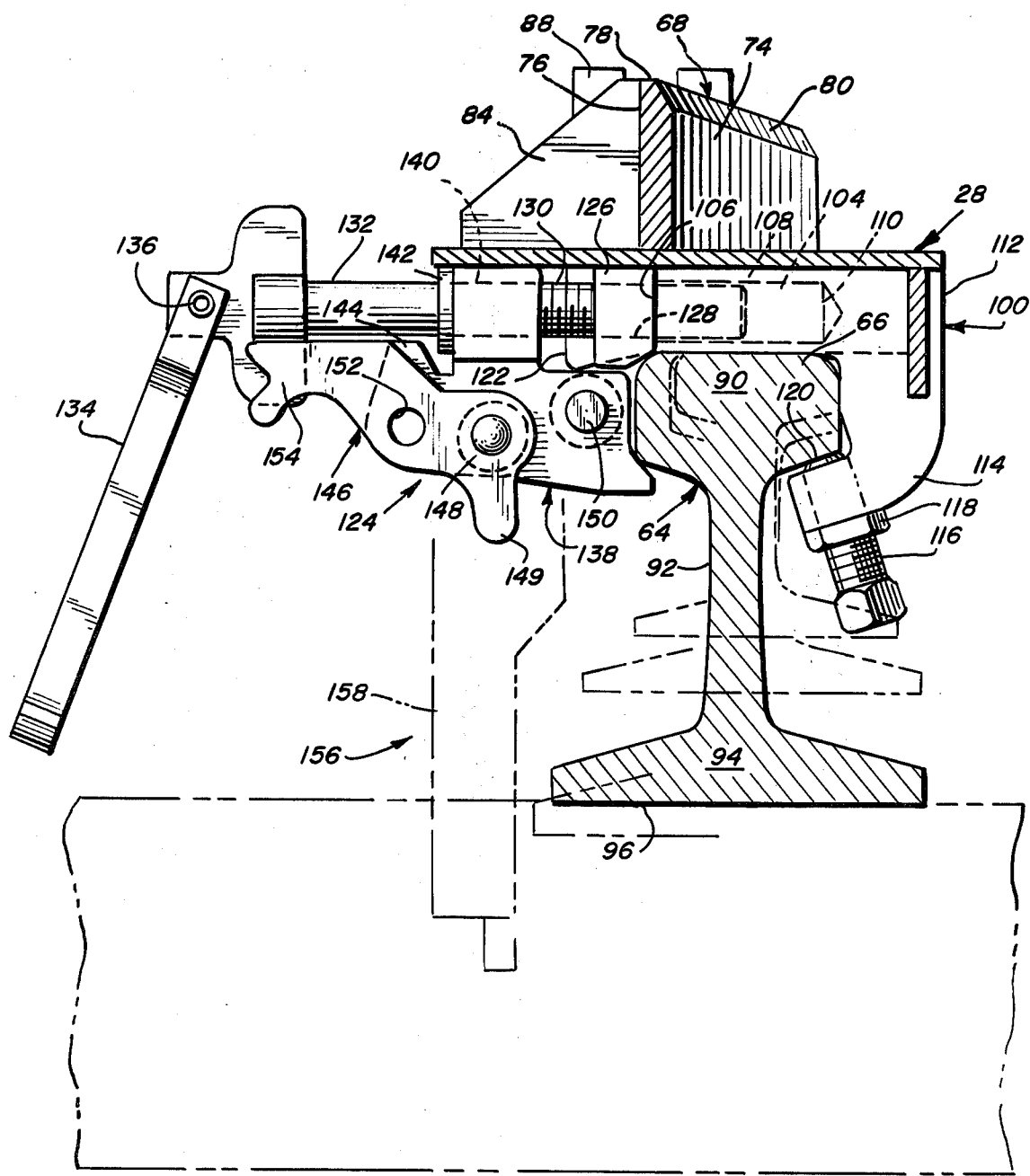
FIG. 5 is a vertical sectional view taken approximately along the line 5—5 of FIG. 3.

The upper portion of the derail 10 which overlies the rail 64 has been described hereinabove, and there will now be described the structure for mounting the derail on a rail. It will first be noted from FIG. 5 that the rail 64 comprises a head portion 90, a web portion 92, and a base or flange portion 94 having a flat bottom 96. The rail 64 shown in solid lines in FIG. 5 represents a relatively large size rail on which the derail 10 may be mounted, and there are indicated in dash lines other smaller size rails on which the same derail may be mounted, it being a feature of the derail of the present invention that it may be mounted on rails of varying sizes and heights.

The derail 10 is secured to the head 90 of the rail 64 by means of a plurality of set screws which engage against the underside of the head 90 on the field side thereof, and a movable clamp member which tightly clamps against the head 90 on the gage side thereof.

Referring first to the field side of the derail 10, there are provided three set screw hook blocks 98, 100 and 102. The center set screw hook block 100 will be described first with reference to FIG. 5. The hook block 100 is somewhat C-shaped, and it has an upper leg 104 welded under the junction of the entry and exit shoes 28 and and 44 on the field side of the derail bar 68. The inner end of the leg 104 as shown at 106 is formed with a threaded bore 108 for a purpose to be described hereinafter, the end of the bore being indicated at 110.

The outer end of the the hook block 100 is shown at 112, and the latter surface blends with a curved lower leg 114 which projects underneath the rail head 90 and carries an adjustable set screw 116 which may be releasably locked in a selected position by a nut 118. It will further be noted that the underside of the leg member 104 is slightly curved to conform with the curvature of the top surface 66 of the rail head 90 on which it is supported. The adjustable set screw 116 has an end portion 120 which engages against the underside of the head 90.

The first set screw hook block 98 (see FIGS. 3 and 4) is similar to the outer portion of the hook block 100, except that it does not have the elongated upper leg member 104 because at the entry end of the derail the raiser bar 12 rests directly on the top surface of the rail 64. The hook block 98 is received in the recess 24 formed in the raiser bar 12 and is welded to the underside of the raiser bar. The hook block 98 includes a set screw (not shown) substantially identical to the set screw 116 for engaging against the underside of the rail head 90.

The third set screw hook block 102 is similar in configuration to the center hook block 100, except it has a somewhat longer upper leg 122 supported on the top rail surface 66, and the upper leg 122 does not have a threaded bore as does the center block leg member 104. The hook block 102 also includes a set screw (not shown) substantially identical to the set screw 116 for engaging against the underside of the rail head 90 in the manner shown in FIG. 5.

It will be understood that the number of set screw hook blocks welded to the derail 10 may be varied, there being three set screws provided in accordance with the particular embodiment being described herein. Moreover, in addition to the above-described hook block members which carry adjustable set screws of the type shown at 116 in FIG. 5, it may be desirable to provide further steel brace members (not shown) welded to the underside of the entry and exit shoe members 28 and 44 and supported on the rail top surface 66 for supporting the derail 10 relative to the rail.

A clamp device, indicated generally at 124 in FIG. 5, is provided for clamping the derail 10 against the gage side of the rail head 90. It will first be noted that a block-like brace member 126 is welded under the junction of the entry and exit shoe member 28 and 44, and the brace 126 is also welded to the inner end 106 of the center hook block upper leg 104. The brace 126 has a threaded bore 128 coaxial with the threaded bore 108. The clamp device 124 includes an elongated screw 130 having an outer extension 132 to which an elongated handle 134 is attached by means of a pivot pin 136.

A clamp plate 138 is formed with a large integral head member 140 which has a bore to permit the head to be carried on the screw 130. The screw 130 is threaded into the bore 128 in the brace 126 and the coaxial bore 108 in the hook block leg 104, and the screw 130 thus serves to mount the clamp device including the clamp plate 138 to the derail. A collar 142 is fixedly secured to the screw extension 132. It is preferred that the screw 130 be made as one component, and the extension 132 with an integral collar 142 be made as a second component, and the two components be fixedly assembled as by pressing the screw into a bore in the end of the member 132.

The purpose of the collar 142 is so that when the handle 134 is operated to thread the screw 130 into the brace 126 and leg 104, the collar will act on the head 140 and force the clamp plate 138 toward the rail head 90. It will thus be understood that through operation of the handle 134, the extension 132 and screw 130 are rotated thereby bringing the clamp plate 138 into engagement with the rail head to secure the derail 10 firmly to the rail, the clamp plate 138 functioning in cooperation with the three set screws as shown at 116 to clamp the derail to the rail head.

The clamp plate 138 includes an upwardly projecting tail 144 which projects up beyond the collar 142, whereby when the handle 134 is operated to withdraw the screw 130, the collar 142 will engage the rail 144 and effect withdrawal of the clamp plate 138 away from the rail head 90 to a released position permitting removal of the derail 10 from the rail. Thus, the collar 142 is fixed relative to the screw 130, and is trapped between the head and tail portions 140 and 144 of the clamp plate assembly, so that axial movement of the screw effects movement of the clamp plate 138 between a clamped position as shown in FIG. 5 and a released position where it is spaced from the rail head 90.

Locking means is provided so that the derail 10 may be locked on the rail 64, and similarly may be locked off the rail, so that it may not be applied to or removed from the rail without use of a key. Such locking means includes a locking lever 146 pivotally supported from the clamp plate 138 by a pivot pin 148 for pivotal movement between a locked position as shown in FIG. 5 and a released position where it moves counterclockwise until a projecting finger 149 on the locking lever engages a stop 150 fixedly carried by the clamp plate.

When the locking lever 146 is in the locking position shown in FIG. 5, a hole 152 in the locking lever is aligned with a similar hole in the tail portion of the latch plate 138. A padlock as shown in FIG. 1 can thus be used to lock the lever 146 in the locking position where a tail 154 of the locking lever blocks movement of the handle 134 and thereby prevents rotation of the screw 130. Accordingly, when the derail 10 is clamped to a rail, and the locking lever 146 is padlocked in the locking position, the derail cannot be removed from the rail without frist removing the padlock. Similarly, if the derail is removed from a rail, and the locking lever 146 is padlocked in the locking position after closing down the clamp opening, it is not possible to secure the derail to a rail without first removing the padlock.

A further important feature of the derail of the present invention comprises a graduated vertical support 156 which comprises an end plate 158 at the entry end of the derail, an end plate 160 at the opposite end of the vertical support, a center brace 162, an inclined lower plate 164, and a bottom edge portion which is inclined downwardly toward the entry end of the derail and is serrated to provide a plurality of teeth 166 which extend along the entire bottom edge of the vertical support 156 from the end plate 158 to the end plate 160.

The vertical support 156 is welded beneath the raiser bar 12 and a portion of the entry shoe 28, and the vertical support extends approximately parallel to the rail 64 on the gage side thereof. When the derail 10 is installed on the rail 64, it is positioned so that the inclined serrated bottom edge of the vertical support 156 engages against the edge of a tie plate or rail anchor or against a crosstie so it is firmly supported thereby. The vertical support 156 thereby affords vertical support for the derail during car wheel entry, and it serves a further very important purpose because through its engagement with a crosstie or tie plate or rail anchor it serves to resist horizontal movement of the derail along the rail when the derail is engaged by a car wheel. A further important feature of the vertical support member 156 is that, due to the graduated lower edge portion with the serratd teeth 166 formed thereon, it serves to adapt the derail for use with a plurality of different rail sizes over a wide range of rail heights.

In operation, FIG. 3 shows the right-hand derail 10 mounted on the right-hand rail 64, whereupon the derail will function to derail a car moving from left to right as viewed in the drawing. When the rail wheel reaches the derail, the wheel flange will engage the ram 22 on the raiser bar 12 and roll up to the top of the raiser bar until it engages the derail bar 68. Thereafter, the wheel flange will be guided along the derail bar 68 as it rolls over the entry shoe 28 and exit shoe 44, until the rail wheel is forced off to the field side of the rail at the exit end of the derail.

It will now be understood that the derail described herein is effective in accomplishing the above-mentioned objects of the present invention. There is no hump or the like formed on the raiser bar 12 for raising the tread portion of the wheel, since the design of the raiser bar effects lifting of the wheel by engagement only with the wheel flange and not the tread portion. The graduated vertical support 156 supports the derail during car wheel entry, and resists horizontal sliding movement of the derail along the rail. In addition, the set screw hook blocks on the field side of the rail, in conjunction with the clamp plate on the gage side of the rail, permit the derail to be secured to the head portion of the rail without need for clamp members which extend beneath the rail. Moreover, the foregoing components for securing the derail to the rail are especially well adapted to permit use of one size derail with a plurality of different track sizes and track heights.

The location of the clamping components is an important feature of the present invention. As described hereinabove, the clamp plate 138 and the set screws as shown at 116 clamp against opposite sides of the rail head adjacent the top of the rail rather than adjacent the bottom flange of the rail member. Furthermore, it is important to note that the elongated screw 130, extension 132 and handle 134 are not only located out of the ballast and tie area, but in fact such components are located above the top of the rail surface making them much more easy to operate than conventional designs.

The derail of the present invention weighs only about 44 pounds and is easily installed on a rail or removed therefrom, so that it is highly portable and can be moved from one location to another as protection is required due to the presence of workmen or equipment in a given area. The portable derail described herein is designed to accommodate heavy tonage, and tests have shown it can readily effect positive derailment of a 100 ton coal car traveling at 8 miles per hour.

Relative to the welding of the components of the portable derail of the present invention, as for example the raiser bar and entry and exit shoe members, various welding techniques may be utilized other than those specifically described herein. In particular, it may not be necessary to utilize the weld troughs between adjacent components as described, and instead it may be sufficient simply to provide a gap between adjacent components to be welded.

What is claimed is:

1. A portable derail of a type which may be releasably secured to a rail for derailing a railcar, said derail including a shoe member which overlies the rail, and a derail bar which forces a rail wheel off to one side of the rail, the improvement comprising, in combination, set screw means carried on one side of the derail for engagement under the rail head on the field side thereof, movable clamp means carried on the other side of the derail for engagement adjacent the gage side of the rail head, said clamp means including a clamp plate having a head member, a rotatable screw for moving said clamp plate to a clamped position, said screw being generally horizontally disposed above the height of said rail head, said clamp plate head member being mounted on said rotatable screw, a manually operable handle for rotating said screw, and releasable locking means which in its locked position prevents rotation of said screw.

2. A portable derail as defined in claim 1 including a raiser bar at the entry end of said shoe member, said raiser bar having an inclined ramp which engages the flange portion of a rail wheel to raise the wheel to the upper surface of said shoe member by engagement with the flange portion of the wheel rather than the tread portion thereof.

3. A portable derail as defined in claim 1 where said locking means includes a locking lever pivotally supported on said clamp plate, said locking lever having a tail portion which interferes with rotation of said screw when said lever is in its locking position.

4. A portable derail as defined in claim 1 where a plurality of said set screw means are carried on said one side of said derail spaced along the length thereof.

5. A portable derail as defined in claim 4 where hook block means are provided to carry said set screw means, said hook block means comprising an upper leg member welded to the underside of said shoe member for overlying the top of said rail, and a lowered curved arm member supporting said set screw means adjacent the underside of said rail head on the field side thereof.

6. A portable derail as defined in claim 1 where said rotatable screw has a collar fixed relative thereto and positioned behind said clamp plate head for forcing said clamp plate toward its clamping position upon rotation of said screw.

7. A portable derail of a type which may be releasably secured to a rail for derailing a railcar, said derail including a shoe member which overlies the rail, and a derail bar which forces a rail wheel off to one side of the rail, the improvement comprising, in combination, clamp means for clamping the derail adjacent the head portion of a rail, manually operable means for actuating said clamp means, and a vertical support member which projects downwardly from the derail and has a lower edge inclined downwardly toward the entry end of the derail, said inclined lower edge being engageable with a tie plate or rail anchor or crosstie to resist horizontal movement of said derail along the rail.

8. A portable derail as defined in claim 7 where said vertical support member is connected to the underside of said shoe member and extends generally longitudinally relative to said derail so as to be approximately parallel to the rail on which said derail is mounted.

9. A portable derail as defined in claim 8 where said vertical support member has teeth-like members formed along said inclined bottom edge.

10. A portable derail as defined in claim 9 where said vertical support extends from the entry end of said derail for at least approximately one-third of the total length of said derail.

11. A portable derail as defined in claim 7 where said vertical support projects downwardly from the gage side of said derail.

12. A portable derail of a type which may be releasably secured to a rail for derailing a railcar, said derail including a shoe member which overlies the rail, and a derail bar which forces a rail wheel off to one side of the rail, the improvement comprising, in combination, set screw means carried on one side of the derail for engagement under the rail head on the field side thereof, movable clamp means carried on the other side of the derail for engagement adjacent the gage side of the rail head, manually operable means for moving said clamp means to a clamped position, and a vertical support member connected to the underside of said shoe member so as to project downwardly from the gage side thereof and having a toothed lower edge inclined downwardly toward the entry end of the derail for engagement with a tie plate or rail anchor or crosstie to resist horizontal movement of said derail along the rail.

13. A portable derail as defined in claim 12 where said clamp means includes a clamp plate having a head member, a rotatable screw for moving said clamp plate to a clamped position, said clamp plate head member being mounted on said rotatable screw, a manually operable handle for rotating said screw, and releasable locking means which in its locked position prevents rotation of said screw.

14. A portable derail as defined in claim 13 where said locking means includes a locking lever pivotally supported on said clamp plate, said locking lever having a tail portion which interferes with rotation of said screw when said lever is pivoted to its locking position.

* * * * *